May 19, 1953 M. T. PHELPS 2,639,179
SELF-ALIGNING SCREW-THREADED FASTENING DEVICE
Filed March 31, 1950
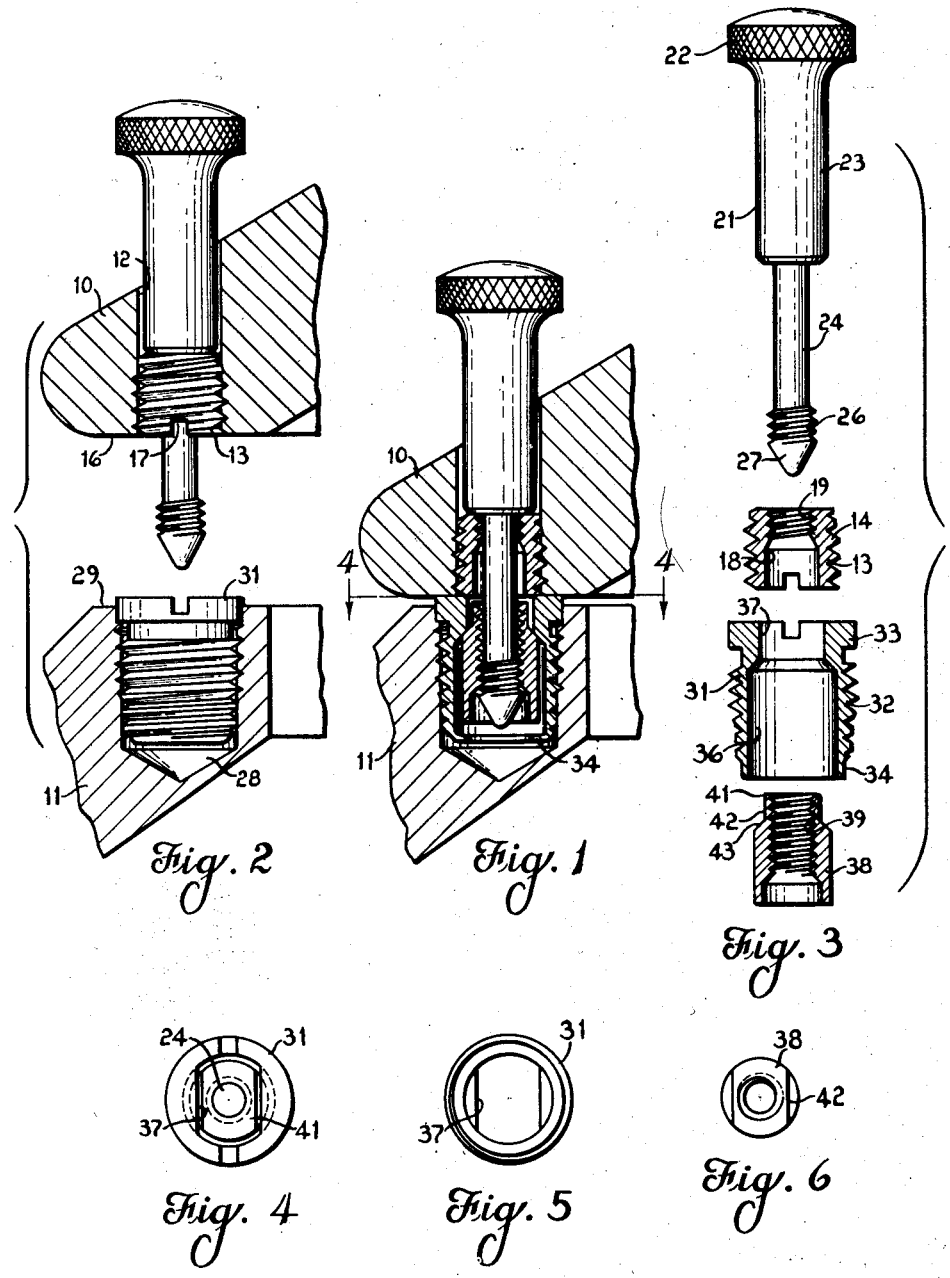
Inventor
Malcolm T. Phelps
By
Richmond A. Hayes
Attorney Patented May 19, 1953

2,639,179

UNITED STATES PATENT OFFICE 2,639,179

SELF-ALIGNING, SCREW-THREADED FASTENING DEVICE

Malcolm T. Phelps, Jamestown, N. Y., assignor to Weber-Knapp Company, Jamestown, N. Y., a corporation of New York Application March 31, 1950, Serial No. 153,083

1 Claim. (Cl. 292—251)

This invention relates to an improvement in devices for fastening or securing two members together. More particularly, the invention is directed to fastening devices that are applicable to secure a lid or cover on a receptacle.

In its present embodiment the invention is shown as a latching or fastening device particularly applicable to multiple use in securing a lid or cover on a large receptacle, such, for example, as a casket.

In all receptacles of large proportions it is necessary that several fastening devices be utilized, if the lid or cover thereof is to be properly secured in place. Such fastening devices consist of two or more parts that must be separately mounted, one on the body of the receptacle, and the other on the lid or cover. In order that the related parts of each device may properly mate or interfit when a cover is moved into a closed position on a receptacle, it is necessary that such parts be accurately located and carefully mounted. Furthermore, fastening devices for use in securing the lid or cover of a casket in place must meet other requirements. The devices must be inconspicuous and yet readily accessible for operation and, of course, since the cover of such a receptacle cannot be even slightly twisted, the interfitting parts of each device must be accurately located.

It is a purpose and object of the present invention to provide a fastening device that will serve singly or in multiple to secure together two members such, for example, as a lid on a receptacle.

It is another object of the invention to provide a fastening device in which the engageable parts are self-centering and will adapt themselves to overcome any slight variation or inaccuracy of spacing or location when in multiple use to secure a lid or cover on a receptacle.

A further object of the invention lies in the provision of a fastening device, the structure of which is such that the various parts may be quickly and easily mounted in a lid or cover and rim of a receptacle.

A still further and important object of the invention lies in the provision of a fastening device in which the only exposed and operative part need not be associated with the other parts thereof until such time as the device is required to function to secure a lid or cover on a receptacle.

Other objects and advantages of the invention will be more fully understood from a consideration of the following specification, taken in conjunction with the accompanying drawing; and in which:

Fig. 1 is a fragmentary sectional view of a lid, held in closed position on a receptacle by a fastening device embodying the invention and shown in part in section;

Fig. 2 is a view similar to Fig. 1, showing the position of the parts of the device prior to engagement;

Fig. 3 is an exploded view of the parts of the fastening device, certain of which are in vertical section to disclose their interfitting relationship;

Fig. 4 is a top plan view of a housing for the keeper part of the device, being taken substantially as indicated by line 4—4 of Fig. 3;

Fig. 5 is a bottom plan view of the housing prior to the assembly with the keeper; and Fig. 6 is a top plan view of the keeper.

Referring more particularly to the drawing, the reference numerals 10 and 11 are employed to designate portions of two members, such as a lid and receptacle, respectively, that are to be secured together by means of a fastening device embodying the invention. The member 10 is formed with a circular opening 12 extending from top to bottom thereof. A collar 13, having a series of external, tapered threads 14, is projected into the opening 12 from the under face 16 of the member 10. The lower end of the collar is notched, as at 17, to enable use of a screw-driver to thread it into this opening. In the present illustration, the member 10 is formed from wood or such other material as a liner for the opening 12 that the threads of the collar 13 will cut their own grooves. It will, however, be understood that the collar 13 could be secured in the lower end of the opening 12 by other conventional means than that shown. The opening 18, extending through the collar, is, at its upper end, of reduced diameter and formed with threads 19.

A bolt 21 is adapted to be carried by the collar 13 and consists of a head 22 and a shank 23 which continues in a rod-like extension 24 of a diameter considerably less than that of the shank. The end of the rod 24 is formed with an enlarged head which includes threads 26 and pointed end 27. To mount the bolt in the retainer-like collar 13, it is necessary to move the threaded end 26 into the opening 18 and, by rotation, the bolt is fed into the collar until the threads 26 have passed the threads 19. At this point the shank 23 will be within the upper portion of the opening 12 of the member and the rod 24 will have free axial movement within the threaded portion of the opening. Due to the difference in diameter between the opening 12 and the shank 23, as well as the difference in diameter between the rod 24 and the crests of the threads 19, the bolt 21, when assembled with the collar 13, may have a small amount of rocking motion.

The member 11, as shown in Fig. 2, is formed with a circular opening 28 that extends downwardly a given depth from the upper face 29 thereof. A housing 31 is intended to be mounted in this opening. This housing is formed with external threads 32 which are somewhat tapered from the rim 33 thereof to the small annular flange 34 at the other end. The housing is intended to be force threaded into the opening 28, much in the manner of the retainer collar 13. Here also it is contemplated that means other than the threads shown may be provided for securing this housing against displacement from the member 11. An opening 36 extends through the housing. That portion of the opening beneath the rim is circular. However, the rim is so formed as to provide inwardly set, flat faces or sides 37.

A keeper 38 for the bolt 21 consists of a circular member through which a threaded opening 39 extends. The body of the keeper is of considerably less diameter than that of the opening 36 of the housing. The upper end or neck 41 of the keeper is formed with opposite, plane faces 42. The body of the keeper and the neck are connected by an annular, inclined shoulder 43. The proportions of the neck of the keeper 38 are such that it will fit loosely in the upper end of the opening in the housing 31. Of course, the faces 37 and 42 of the housing and keeper are such as to prevent relative rotation of these parts. The keeper is assembled with the housing prior to installation in the member 11 and this is accomplished by projecting the keeper into the opening 36 of the housing from its lower end and relatively adjusting these parts until the neck 41 lies at least partly within the rim 33. The flange 34 may now be bent or crimped inwardly to hold the keeper within the housing. It will be observed that the relative proportions of the keeper and housing are such that, with an end of the keeper at rest on the inturned flange 34, the neck portion thereof, in part, lies within the upper end of the housing opening and, therefore, in no relative position of these parts can the keeper be rotated.

Having described the structural details of the parts of the fastening device embodying the invention, a brief statement of their operation is set out as follows: It will be understood that the bolt 21, when mounted as shown in Fig. 2, will be capable of a limited amount of wobble and that as the members 10 and 11 are brought into proximity, the end 27 will center in the threaded opening 39 of the retainer. Any slight misalignment of the openings 12 and 28 of the members 10 and 11, respectively, will undoubtedly be overcome by the freedom of the bolt within its mounting. However, should further misalignment of the above mentioned openings be present, the keeper will be capable of lateral adjustment in addition to that of the bolt and to such an extent that the threaded end 26 will readily engage with the threads of the opening 39. Rotation of the bolt serves to feed it into the keeper and this first moves the keeper upwardly within the housing to a point where the annular shoulder 43 abuts corresponding surfaces on the housing. Further rotation of the bolt 21 draws the member 10 downwardly to a point where the member surfaces 16 and 29 abut, or to a point where the upper face of the housing 31 is in contact with the lower edge of the collar 13.

To release and separate the members 10 and 11, it is merely necessary to reversely rotate the bolt 21, until it has been disengaged from the threads of the keeper 38. Until such time as the lid or cover of a casket is to be secured in closed position, it is undesirable that the lid fasteners be conspicuous or in any way constitute projecting, interfering obstructions. With the present invention it is practical to withhold assembling the bolts 21 with the retainer collars 13 until such time as the lid or cover is brought into closed position and intended to be secured to the body of the receptacle.

Although applicant has shown and described only one form of his invention, it will be apparent that variations in size and proportions of the parts thereof may be made in its adaptation as a means of fastening various members together or lids on receptacles, and that such variations are considered as being within the scope of the invention insofar as they are set out in the annexed claim.

Having thus set forth my invention, what I claim as new and for which I desire protection by Letters Patent is:

A fastening device for securing two members together comprising a bolt, a retainer threaded into one of said members loosely mounting said bolt for free rotating movement and limited axial movement, threads adjacent one end only of said bolt, said end being beveled to form a pilot, a housing comprising an externally threaded annular sleeve threaded into the other of said members, a reduced diametered portion in the outer end of said housing forming a shoulder, an internally threaded keeper for receiving the pilot end of said bolt, said keeper being mounted in said housing and having substantial lateral movement with respect thereto, a shoulder on said keeper larger than the opening in the shoulder of said housing, the keeper shoulder being engageable with the housing shoulder to limit relative axial movement in one direction, and interengaging means on said keeper and said housing for preventing relative rotation.

MALCOLM T. PHELPS.

References Cited in the file of this patent

UNITED STATES PATENTS

| Number | Name | Date |
|---|---|---|
| 748,078 | Kaisling | Dec. 29, 1903 |
| 950,771 | Lohmann | Mar. 1, 1910 |
| 1,120,403 | O'Leary | Dec. 8, 1914 |
| 1,251,676 | McCaffrey | Jan. 1, 1918 |
| 1,694,580 | Carr | Dec. 11, 1928 |
| 2,403,810 | Lord | July 9, 1946 |

FOREIGN PATENTS

| Number | Country | Date |
|---|---|---|
| 226,990 | Switzerland | May 15, 1943 |